United States Patent [19]

Bayer

[11] 3,727,473
[45] Apr. 17, 1973

[54] VARIABLE SPEED DRIVE MECHANISMS

[76] Inventor: Edward Bernard Bayer, 27, Melrose Gardens, North Street, Illovo, Johannesburg, Republic of South Africa

[22] Filed: Apr. 14, 1971

[21] Appl. No.: 133,797

[52] U.S. Cl. .................................................. 74/198
[51] Int. Cl. ............................................. F16h 15/08
[58] Field of Search ........................................ 74/198

[56] References Cited

UNITED STATES PATENTS

| | | | |
|---|---|---|---|
| 3,293,947 | 12/1966 | Chery | 74/198 X |
| 3,367,198 | 2/1968 | Schotter | 74/198 |
| 3,585,871 | 6/1971 | Alsch | 74/198 |

*Primary Examiner*—Leonard H. Gerin
*Attorney*—Young & Thompson

[57] ABSTRACT

A variable speed drive mechanism is disclosed wherein a rotatable drive member imparts movement to a driven member through a cage containing a series of rotary elements sandwiched between the two members, at least one of which is resiliently flexible. The elements engage a circular track comprising grooves of concave cross-sectional configuration disposed on the members. The grooves are of slightly larger diameter than the elements so that on flexing one of the members the effective radius of contact between the elements and the groove walls may be varied and the rotational speed imparted to the other member varied accordingly. A single directional variable speed unit is thus provided. In another unit two sets of rotary elements of the aforesaid kind are linked in back to back relationship with their cages interconnected to provide a variable speed unit with a greater speed range which passes through zero and is reversible. These units not only require fewer components than the conventional comparable unit, but the components are also relatively simple and cheap to manufacture.

15 Claims, 14 Drawing Figures

VARIABLE SPEED DRIVE MECHANISMS

This invention relates to variable speed drive mechanisms.

The problem of speed variation is a common one in the field of engineering. It is frequently required to change the speed of the moving parts of a machine obtained from a drive rotating at constant speed and many devices have been suggested to achieve this object. Unfortunately the known devices are usually of a bulky nature and also expensive. It is accordingly an object of this invention to provide a variable speed drive mechanism with which these disadvantages may be overcome or at least minimised.

According to the invention a variable speed drive mechanism includes a rotatable drive member; a series of elements rotatably engaging the drive member to be rotated thereby along a substantially circular engagement zone of variable diameter on the drive member; and a driven member rotatable in response to rotation of the rotary elements.

When the radius of the engagement zone is increased or decreased, the circumference of the engagement zone is accordingly increased or decreased so that the peripheral speed imparted by the drive member to the rotary elements is increased or decreased, thereby increasing or decreasing the speed of rotation of the driven member.

Further, according to the invention the drive member is resiliently flexible in a direction transverse its plane of rotation.

The drive member may hence be deformed by a force acting on it in a direction transversely its plane of rotation and the radius of the engagement zone varied accordingly.

The mechanism preferably includes a second engagement zone located on a stationary member which together with the drive member defines a track along which the rotary elements may move.

The engagement zones preferably comprise circular grooves of concave cross-sectional configuration located on the drive and stationary members respectively, in which the rotary elements are confined to move.

The rotary elements are preferably spheres of slightly smaller diameter than that of the grooves.

With the drive member in underformed condition, the spheres engage the bottom of the grooves. By flexing the drive member inwardly or outwardly the spheres may be caused to engage the grooves in different positions along a line disposed on the walls transverse the grooves so that the effective radius of the contact zone between the spheres and the groove walls is varied accordingly.

Further according to the invention the rotary elements are rotatably carried in a carriage.

On rolling along the said track the rotary elements carry the carriage along with it.

When the drive member is rotated at a constant speed, say 1,000 r.p.m., rotary elements will, depending on such factors as slip etc., roll along the track and according to known principles carry the carriage along at substantially half this speed, say 500 r.p.m.

By deforming the drive member the speed of the driven member may be varied so that it may be made to rotate slower or faster than the said 500 r.p.m.

Further according to the invention the driven member is also resiliently flexible in a direction transversely its plane of rotation.

Preferably at least those parts of the drive and driven member which define the track between them are in the form of resiliently flexible discs.

Thus, for example, the flexible discs may be similar to Belville springs.

The two flexible discs which are preferably in substantially parallel relationship to each other may be disposed at any preferred angle relative to the axis of rotation of the drive and/or driven members.

The velocity of a sphere between two surfaces depends on the speeds of the surfaces rolling on it.

Therefore: $V_G = (V_E + V_F /2)$  1.

Where $V_G$ = velocity of the sphere
and $V_E$ and $V_F$ = velocity of the moving surfaces respectively.

The velocity of a surface of a rotating disc in contact with a sphere depends on the speed of the disc and the radius at which it is in contact with the sphere.

Therefore: $V = N\pi D$   $N = $ rpm  2.

$D = $ Dia at point of contact and $N_G \pi D_G = (N_E \pi D_E + N_F \pi D_F / 2)$  3.

where E and F refer to the two flexible members respectively and G to the carriage in which the balls are contained.

Further according to the invention the mechanism includes a second carriage and series of spheres as aforesaid, the second carriage being connected to the first carriage for rotation therewith and the spheres of the second carriage being rotatable in a substantially circular track of which the diameter is preferably also variable, the track being defined between a second drive member which is prefereably also flexible and which is connected to the first drive member for rotation therewith and a second driven member adapted for rotation in response to rotation of the spheres of the second carriage.

When the first drive member is now rotated at constant speed, say 1,000 r.p.m., the second drive member will rotate at the same speed and the first and second carriages at approximately 500 r.p.m. The second carriage and second drive member is therefore rotating in phase thus compensating for the rotary movement of the spheres in the second carriage. The second driven member will hence remain stationary.

When force is now applied to deform the first drive member and preferably also the second driven member the first carriage will, as already explained, rotate at a slower or faster speed and the second carriage will hence rotate at the same slower or faster speed. The second carriage and the second drive member, the latter which would still be rotating at the original constant speed of 1,000 r.p.m., will now be rotating out of phase and the spheres of the second carriage will hence impart movement to the second driven member which will start to rotate. By varying the force applied to the first drive member and preferably also the second driven member, the speed of rotation of the second driven member may be varied accordingly and a very effective variable speed unit is provided which has a greater speed range, passed through zero, and is reversible.

Further according to the invention the initial driving force may be applied to any one of the parts which are referred to in this specification as the first drive member, the carriages, the second drive member, or the second driven member.

In one preferred form of the invention the carriages may comprise ball races integrally connected. In another form of the invention the rotary elements are contained between two discs of convex shaped configuration in cross-section in back to back relationship to define a circular track which becomes progressively narrower in the direction of the mid-points of the discs.

In one form of the invention at least one of the ball sets may be pre-loaded.

Preferred embodiments of the invention will now be described by way of example only with reference to the accompanying drawings wherein.

Figure 1:
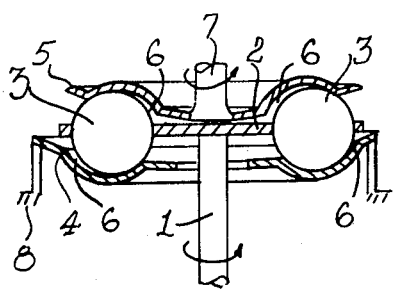
FIGS. 1 and 2 show in section diagrammatic views of one configuration of a single directional variable speed unit according to the invention, using a single set of balls.
Figure 2:
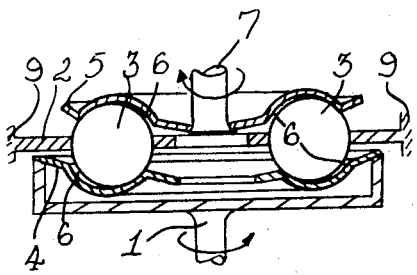

Referring now to the configurations shown in FIGS. 1 and 2, the unit includes a shaft 1, which may either comprise the input or output to the unit (say the input) and a carriage or cage 2 in which a plurality of balls 3 is rotatably carried.

Figure 13:
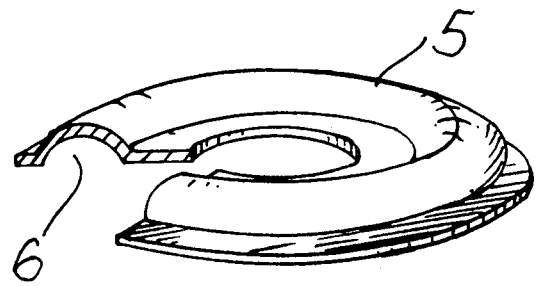
FIGS. 13 and 14 are perspective views showing parts of the previous configurations in more detail.

Two resiliently flexible discs 4 and 5, which may be in the nature of Belville springs are each provided with a circular groove 6 to define between them a circular track which is of slightly larger diameter, (say a few thousandths of an inch) than that of balls 3. One disc and track is shown in more detail in FIG. 13. In FIGS. 1 and 2 the difference in size between the ball and track is shown enlarged so that the principle of the invention may be better understood.

Flexible disc 5 is integrally connected to a shaft 7, which may comprise either the output or input (say the output) of the unit.

In the unit shown in FIG. 1, shaft 1 is integrally connected to cage 2 while flexible disc 4 is shown to be secured to a fixed surface at 8. In the unit shown in FIG. 2, shaft 1 is integrally connected to flexible disc 4 while cage 2 is shown to be secured to a fixed surface at 9.

Figure 3:
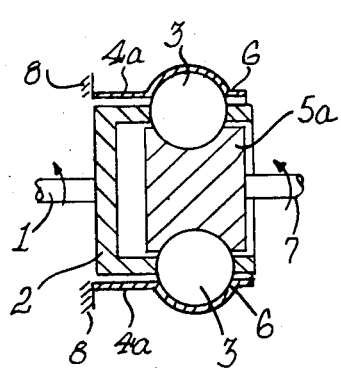
FIGS. 3 and 4 are similar views of annother configuration of this kind.
Figure 4:
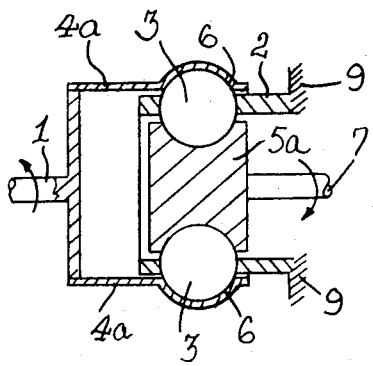

In the units shown FIGS. 3 and 4 (where components corresponding to those of the units shown in FIGS. 1 and 2 are indicated by corresponding numbers) the track for the balls 3 is defined between resiliently flexible member 4a and rigid member 5a. Member 4a is shown in more detail in FIG. 14. To improve the radial flexibility of member 4a it is provided with a number of axially extending slots 4b.

When shaft 1 of units 1 and 3 is being rotated cage 2 is carried along at the same rotational speed as that of shaft 1 and with discs 4, 5 or 4a in the undeformed state disc 5 or member 5a will rotate in response to the rotary movement of balls 3, and depending on such factors as slip, etc, at approximately twice the speed of cage 2. Output shaft 7 will hence rotate at about twice the speed of input shaft 1.

When discs 4 and 5 or 5a are now deformed by reason of a force acting on either of shafts 1 or 7, or on both, to cause them to flex either inwardly or outwardly, the points of contact of balls 3 in the track defined by grooves 6 will change thus changing their radius of contact with disc 5 or member 5a and hence the speed of rotation which balls 3 will impart thereto.

Where discs 4, 4a and 5 of the units shown in FIG. 2 and 4 are in the undeformed state shaft 7 will rotate at the same speed but in the opposite direction to that of shaft 1. By deforming these discs in the aforesaid manner the speed of rotation of shaft 7 may be accordingly changed.

In all the above cases $$N_G \pi D_G = (N_E \pi D_E + N_F \pi D_F)/2 \qquad 4.$$

i.e. $N_G D_G = (N_F D_F + N_E D_E)/2$ \qquad 5.

One of the three parts must be held steady so that $$N_G = 0 \text{ or } N_F = 0 \text{ or } = N_E = 0 \qquad 6.$$

then $N_F D_F = N_E D_E$ and $N_G D_G = (N_E D_E/2)$ and $N_G D_G = (N_F D_F/2)$ \qquad 7.

thus $N_F/N_E = D_E/D_F$ and $N_G/N_E = (D_E/D_G)$ ½ and $N_G/N_F = (D_F/D_G)$ ½ \qquad 8.

Using the notation $N_{in}$ = input speed
$N_{out}$ = output speed
and $D_1$ and $D_2$ the two diameters involved
and substituting these in the previous results in equations 8, $$N_{out} = N_{in} (D_1/D_2) \qquad 9.$$

or $N_{out} = (N_{in}/2)(D_1/D_2)$ \qquad 10.

The change in the ratio $D_1/D_2$ gives the speed range. The limits of this ratio are determined by the physical limits imposed by the geometry of the set up.

Figure 5:
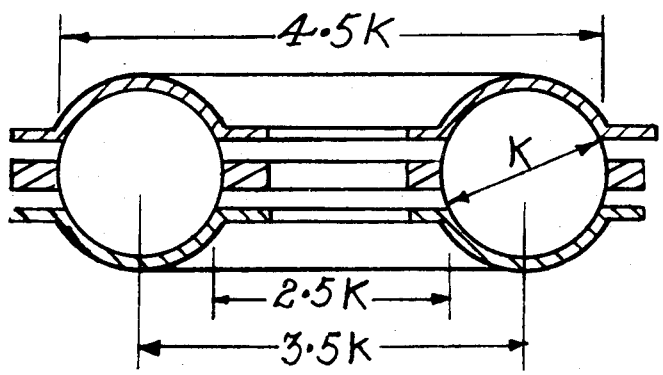
FIGS. 5 and 6 are diagrammatic representations showing some limiting sizes for the two above said configurations.
Figure 6:
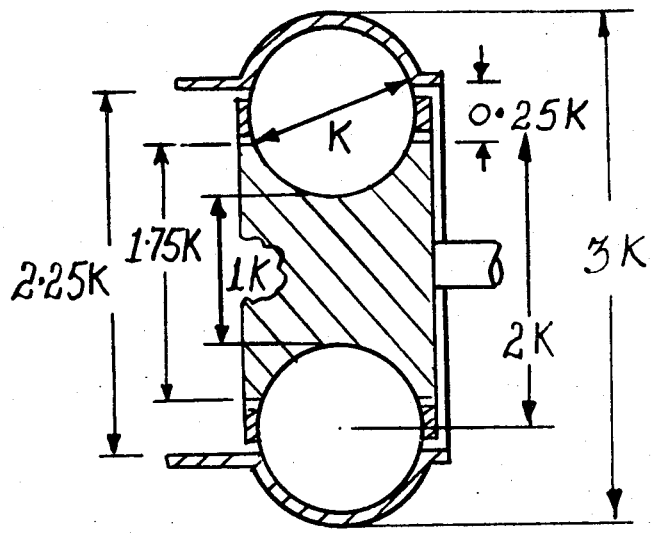

Making the ball size as large as possible relative to the other dimensions and giving all the dimensions in terms of the ball diameter, values for the first configuration may be obtained from FIG. 5 and those for the second configuration from FIG. 6.

Thus for the first configuration
$D_1/D_2$ can vary from 4.5/2.5 to 2.5/4.5
i.e. from 1.8 to 0.55 \qquad 11.

For the second configuration
$D_1/D_2$ can vary from 3/1 to 2.25/1.75
i.e. from 3 to 1.2 \qquad 12.

Thus substituting these values in equations 9 and 10 the possible ratios are:

| | | or changing input to output |
|---|---|---|
| configuration 1 | 1 : 0.55 to 1.8 | 1:0.55 to 1.8 |
| or | 1 : 0.27 to 0.9 | 1:0.37 to 1.1 |

| configuration 2 | 1 : 1.2 to 3.0 | 1:0.3 to 0.83 |
| --- | --- | --- |
| or | 1 : 0.6 to 1.5 | 1:0.66 to 1.58 |
| or | 1 : 0.15 to 0.4 | 1:2.5 to 6.6 |

Figure 7:
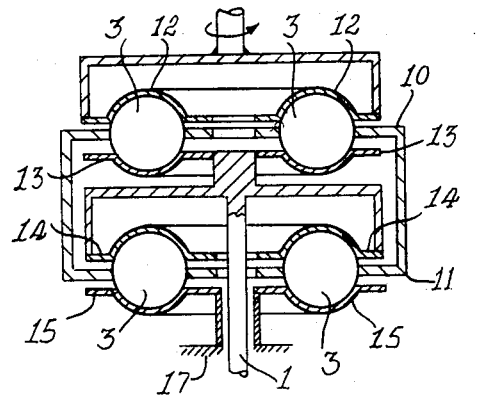
FIGS. 7, 8 and 9 show in section diagrammatic views of one configuration of a variable speed unit which is reversible according to the invention, using a double set of balls.
Figures 8, 9:
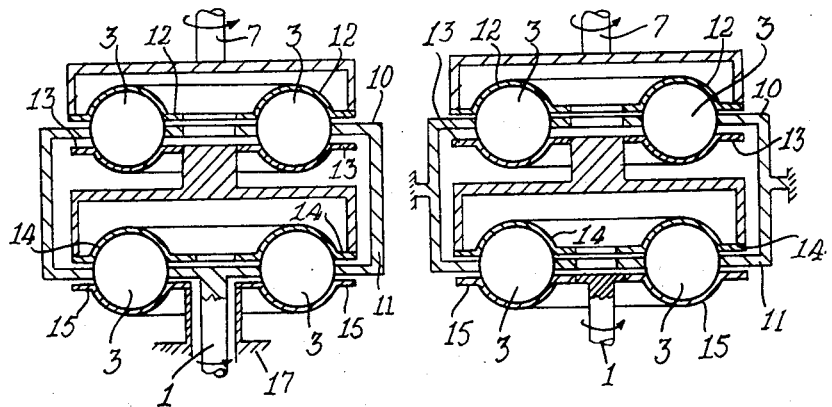

Referring now to FIGS. 7 to 9 each of the units includes a pair of interconnected carriages or cages 10 and 11 in each of which the balls 3 may rotate in tracks defined between resiliently flexible members 12 and 13 and 14 and 15 respectively.

Shafts 1 and 7 represent respectively the input and the output to the unit. In each case is shaft 7 connected to flexible member 12.

Figure 10:
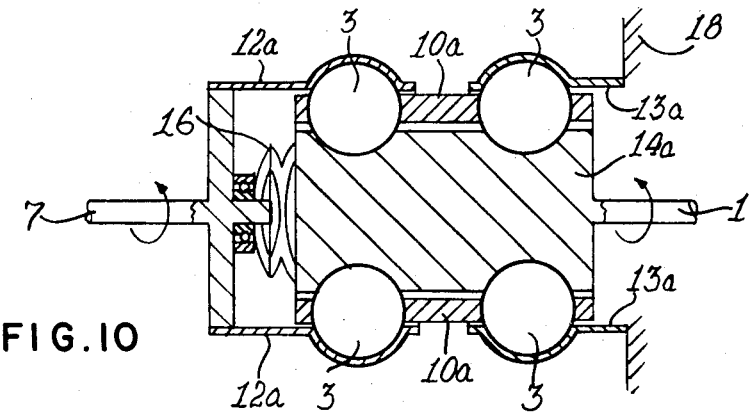
FIGS. 10, 11 and 12 are similar views of another configuration of this kind.
Figure 11:
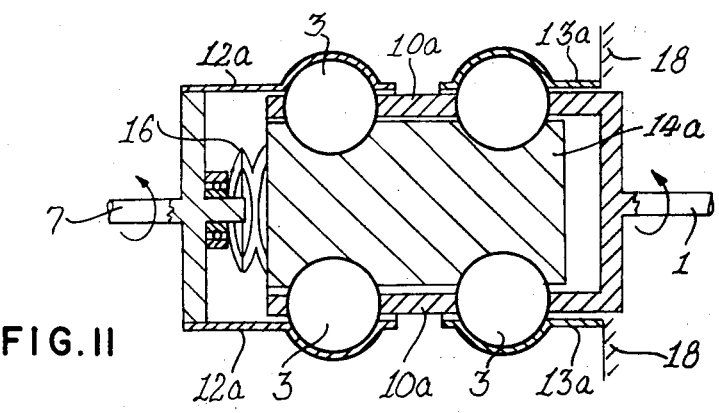
Figure 12:
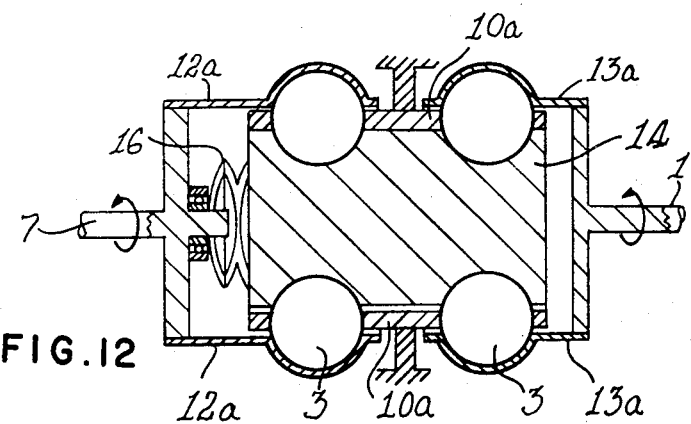
Figure 14:
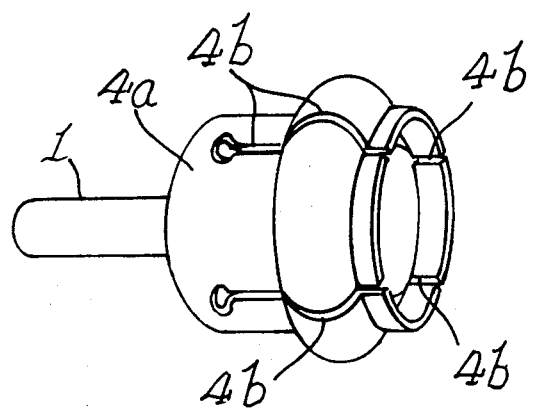

In the units shown in FIG. 10 to 12 the two tracks in which balls 3 are to rotate are respectively defined between a rigid member 14a and each of two flexible members 12a and 13a which are of the same configuration as that shown in detail in FIG. 14. Both sets of balls are rotatably carried in the same cage 10a. Furthermore, one ball set of these units is preferably preloaded by the provision of flexible discs 16 adapted to act on rigid member 14a.

In the units shown in FIGS. 7 and 10 input shaft 1 is connected to the inner movable members 13 and 14 and 14a respectively while flexible discs 15 and 13a are secured to fixed surfaces as indicated at 17 and 18 respectively.

In the units shown in FIGS. 8 and 11 input shaft 1 is connected to cage 10, which in turn is connected to cage 11 and to cage 10a respectively. Again flexible discs 15 and 13a are secured to fixed surfaces as indicated at 17 and 18 respectively.

In the units shown in FIGS. 9 and 12 and input shaft 1 is connected to flexible discs 15 and 13a respectively while interconnected cages 10 and 11 and cage 10a are secured to fixed surfaces as indicated at 19 and 20 respectively.

To understand the underlying principle of all the units shown in FIGS. 7 to 12, the bottom ball set only of the unit shown in FIG. 7 may first be considered. With an input of N r.p.m. to disc 14 and disc 15 held steady, cage 11 must rotate at ½ N r.p.m. Now the top ball set is the same as the bottom set inverted and disc 13 of the top set is therefore also being driven at N r.p.m. exactly like the bottom disc 14 and its case 10 (connected to the bottom cage 11) is rotating at ½ N r.p.m. exactly like cage 11 of the bottom set. Thus disc 12 of the top set race must also rotate at exactly the same speed as its couterpart of the bottom set and disc 12 accordingly does 0 r.p.m.

As discs 12 and 13 and 14 and 15 are deflected this balance of motions is upset and disc 12 will rotate in either direction depending on whether cage 10 is rotating too fast or too slow for the particular contact diameter ratio for the top ball set. The cage speed being set by the contact diameter ratio of the bottom bearing. With this arrangement a variable forward, a zero or a variable reverse output is available in one unit.

THE RATIOS AVAILABLE FROM THE DOUBLE BALL SET UNITS.

The speed ratios are derived as follows:

As previously shown (equation 1) the cage velocity is given by $$V_c = (V_a + V_b/2) \quad\quad 13.$$

Where $c$=cage and $a$ and $b$ denote the two surfaces in contact with the ball and as $V_a = N_a D_a$ as shown in equation 2 thus $N_c D_c = (N_a D_a + N_b D_b)/2$     14.

Applying this to the two sets of balls of the unit shown in FIG. 7, $$N_G N_G = (N_H D_{D'} + N_F D_C)/2 \quad\quad 15.$$

also $N_G D_G = (N_E D_A + N_F D_B)/2$     16.

thus $N_H D_{D'} + N_F D_C = N_E D_A + N_F D_B$     17.

$$N_H D_{D'} - N_E D_A = N_F (D_B - D_C) \quad\quad 18.$$

Where A,B,C,D' respectively represents the points of contact of balls 3 with the track defined between the relevant flexible discs and E,F,G and H respectively represent the components 12; 13 and 14 (which are interconnected); 10 and 11 (which are interconnected); and surface 17. Now anyone of the four parts E, F, G and H can be held steady i.e. $N_E = 0$ or $N_F = 0$ or $N_G = 0$ or $N_H = 0$     19 and the input and output can be connected to any of the remaining three parts.

$N_E = 0$ .............................

From eq. 16:

$$N_G D_G = \frac{N_E D_A}{2};$$

thus, $$\frac{N_E}{N_G} = \frac{2D_G}{D_A} \quad \ldots 22.$$

From eq. 18:
$N_H D_{D'} = N_E D_A$; thus, $$\frac{N_E}{N_H} = \frac{D_{D'}}{D_A} \quad \ldots 24.$$

$N_F = 0$ .............................

$$\frac{N_E}{N_F} = -\frac{D_B}{D_A} \quad \ldots 20.$$

From eq. 18: $N_F D_{D'} = N_F(D_B - D_C) + N_E D_A$;
but from eq. 20 above, $$N_F = -\frac{N_E D_A}{D_B};$$

thus, $$N_H D_{D'} = -\frac{N_E D_A}{D_B}(D_B - D_C) + N_E D_A,$$

$$N_H D_{D'} = -N_E D_A \left(\frac{D_B - D_C}{D_B} - 1\right),$$

$N_G = 0$. From eq. 16: $N_E D_A = -N_F D_B$; thus, $N_H = 0$. From eq. 18: $N_E D_A = -N_F(D_B - D_C)$; thus, $$\frac{N_E}{N_F} = -\frac{(D_B - D_C)}{D_A} \quad \ldots 21.$$

From eq. 16: $2N_G D_G = N_E D_A + N_F D_B$; but from eq. 21 above, $$N_F = N_E \frac{D_A}{(D_B - D_C)};$$

thus, $$2N_G D_G = N_E D_A \frac{(D_B - D_C)}{D_B - D_C};$$

wait $$2N_G D_G = -N_E D_A \frac{D_C}{(D_B - D_C)};$$

thus, $$\frac{N_E}{N_G} = -2\frac{D_G}{D_A}\frac{(D_B - D_C)}{D_C} \quad \ldots 23.$$

$$N_H D_{D'} = -N_E D_A \left(-\frac{D_C}{D_B}\right);$$

thus, $$\frac{N_E}{N_H} = \frac{D_B D_{D'}}{D_A D_C} \quad \ldots 25.$$

$N_E = 0$. From eq. 16: $2N_G D_G = N_F D_B$; $N_F = 0$ ............ $N_G = 0$ ............................................ $N_H = 0$. From eq. 15: $2N_G D_G = N_F D_C$; thus, thus, $$\frac{N_F}{N_G} = \frac{2D_G}{D_B} \quad \ldots 26. \qquad\qquad\qquad\qquad\qquad\qquad\qquad \frac{N_F}{N_G} = \frac{2D_G}{D_C} \quad \ldots 27.$$

From eq. 18: $N_H D_{D'} = N_F (D_B - D_C)$; ........................ From eq. 15: $N_H D_{D'} = -N_F D_C$; thus, thus, $$\frac{N_F}{N_H} = \frac{D_{D'}}{(D_B - D_C)} \quad \ldots 28. \qquad\qquad\qquad\qquad \frac{N_F}{N_H} = -\frac{D_{D'}}{D_C} \quad \ldots 29.$$

From eq. 15: $2N_G D_G = N_H D_{D'} + N_F D_C$; From eq. 15:
but from eq. 26 above, $$N_F = \frac{2D_G}{D_B} N_G; \qquad\qquad N_G D_G = \frac{N_H D_{D'}}{2};$$

thus, $$2N_G D_G = N_H D_{D'} + \frac{2D_G}{D_B} N_G D_C; \qquad \frac{N_G}{N_H} = \frac{D_{D'}}{2D_G} \quad \ldots 30.$$

thus, $$2N_G D_G \left(1 - \frac{D_C}{D_B}\right) = N_H D_{D'};$$

thus, $$\frac{N_G}{N_H} = \frac{D_{D'}}{2D_G} \frac{D_B}{(D_B - D_C)} \quad \ldots 31.$$

---

From the foregoing it can be seen that for the case of $N_F = 0$ i.e. the centre portion held steady the ratios are no better than for single ball sets. For the case of $N_G = 0$ i.e. the cage held steady there is no advantage over single ball sets except if the input or output are connected to E or H the speed ratio is increased over the single ball sets. For the cases of $N_E = 0$ and $N_H = 0$ useful results are obtained for 4 cases. The useful summarised are summairsed below —

$N_E = 0 \qquad N_F = 0 \qquad N_G = 0 \qquad N_H = 0$ $$N_F/N_H = D_{D'} / (D_B - D_C) \qquad 32.$$

$$N_E/N_F = -(D_B - D_C)/D_A \qquad 33.$$

and $$N_G/N_H = D_{D'} / 2D_G [D_B/(D_B - D_C)] \qquad 34.$$

$$N_E/N_H = (D_B D_{D'} / D_A D_C) \qquad 35.$$

$$N_E/N_G = -2D_G/D_A [(D_B - D_C)/D_C] \qquad 36.$$

The equations with $N_E = 0$ and $N_H = 0$ give the same results as they are geometrically similar and hence only the results for $N_H = 0$ will be shown. ($N_F/N_H$ must be calculated in the inverse, i.e. $N_H/N_F$ to give the correct results). The limits of the possible ratios are determined by the physical limits imposed by the geometry of the set up. These sizes are given in FIG. 6 and are for configuration of units illustrated in FIGS. 7 to 9.
$D_A = D_C$ varying from 2.5K to 4.5K while $D_B = D_{D'}$ varies from 4.5K to 2.5K ($D_G = 3.5K$)
Substituting these values in the above equations : 33, 36 & 35
For $N_H = 0$
$N_E/N_F = -(4.5 - 2.5)/2.5$ to $-(2.5 - 4.5)/4.5$
i.e. $N_E/N_F = -0.8$ to $0.445$
i.e. a ratio of 1 : 0.445 to 0 to $-0.8$
and $N_E/N_G = -[2\cdot3.5 \ (4.5 - 2.5)/2.5\cdot2.5]$ to $-[2\cdot3.5 \ (2.5 - 4.5)/4.5\cdot4.5]$
$N_E/N_G = -2.23$ to $0.69$
i.e. a ratio of 1 : 0.69 to 0 to $-2.23$
For the special non reversible case with $N_G = 0$
where $N_E/N_H = D_B D_{D'} / D_A D_C$
$N_E/N_H = (4.5\cdot4.5)/(2.5\cdot2.5)$ to $(2.5\cdot2.5)/(4.5\cdot4.5)$ i.e. $N_E/N_H = 3.2$ to $0.31$
i.e. a ratio of 1 : 0.31 to 3.2
Applying the formulae to the configuration of the units shown in FIGS. 10 to 12 with the limits shown in FIG. 6 of:
when $D_A = 3K$, $D_B = 1K$, $D_C = 1.75K$, $D_{D'} = 2.25K$, $D_G = 2K$
when $D_A = 2.25K$, $D_B = 1.75K$, $D_C = 1K$, $D_{D'} = 3K$, $D_G = 2K$
Substituting these values in equations 33, 35 and 36 results in the following ratios:
For $N_H = 0$
$N_E/N_F = -0.33$ to $0$ to $0.25$
i.e. a ratio of 1 : $-0.33$ to $0$ to $0.25$
$N_E/N_G = -0.57$ to $0$ to $0.33$
i.e. a ratio of 1 : $-0.57$ to $0$ to $1.33$
For the special non-reversible case with $N_G = 0$
$N_E/N_H = 0.428$ to $2.34$
i.e. a ratio of 1 : 0.428 to 2.34.
It will be appreciated that with a variable speed drive mechanism according to the invention units are provided comprising less parts than in other comparable mechanisms. Furthermore these parts are simple and cheap to manufacture.

It will be further appreciated that with a variable speed drive mechanism according to the invention many variations in detail are possible without departing from the scope of the appended claims.

I claim:

1. A variable speed drive mechanism including a rotatable drive member; a series of rotary elements rotatably engaging the drive member to be rotated thereby along a substantially circular engagement zone of variable diameter on the drive member; and a driven member rotatable in response to rotation of the rotary elements, at least said zone on the drive member being resiliently flexible in a direction transversely of its plane of rotation.

2. The mechanism of claim 1 wherein the rotary elements are barrel shaped or similarly contoured rollers and their track defined between two substantially flat or slightly curved surfaces.

3. The mechanism of claim 1 including a second engagement zone located on a stationary member which together with the drive member defines a track along which the rotary elements may move.

4. The mechanism of claim 3 wherein the engagement zones comprise circular grooves of concave cross-sectional configuration located on the drive and stationary members respectively, in which grooves the rotary elements are confined to move.

5. The mechanism of claim 1 wherein the rotary elements are spheres of slightly smaller diameter than that of the grooves.

6. The mechanism of claim 1 wherein the rotary elements are rotatably carried in a cage or carriage.

7. The mechanism of claim 1, wherein the driven member is resiliently flexible in a direction transversely of its plane of rotation.

8. The mechanism of claim 1, wherein at least those parts of the drive and driven member which define the track between them are in the form of resiliently flexible discs.

9. The mechanism of claim 8 wherein the flexible discs are Belville springs.

10. The mechanism of claim 3 wherein the rotary elements are contained between two discs of convex configuration in cross section in back to back relationship to define a circular track which becomes progressively flatter in the direction of the mid-points of the discs.

11. The mechanism of claim 1 wherein at least one of the flexible elements is flexible in a direction parallel to its plane of rotation.

12. The mechanism of claim 6 including a second carriage and series of said rotary elements, the second carriage being connected to the first carriage for rotation therewith and the rotary elements of the second carriage being rotatable in a substantially circular track of which the diameter is variable, the track being defined between a second drive member which is flexible and which is connected to the first drive member for rotation therewith and a second member adapted for rotation in response to rotation of the rotary elements of the second carriage.

13. The mechanism of claim 12, wherein the initial driving force may be applied to any one of the parts which are referred to as the first drive member, the carriages, the second drive member, or the second driven member.

14. The mechanism of claim 12 wherein the carriages comprise conventional ball races.

15. The mechanism of claim 12 wehrein at least one of the carriages is pre-loaded.

* * * * *